(12) United States Patent
Kondo et al.

(10) Patent No.: US 7,717,432 B2
(45) Date of Patent: May 18, 2010

(54) PLUNGER SEAL FOR PUMP

(75) Inventors: Yosuke Kondo, Nihonmatsu (JP); Yasuaki Tanabe, Nihonmatsu (JP); Katsutoshi Ishioka, Nihonmatsu (JP); Sosuke Ito, Fukushima (JP); Shinji Nagasawa, Fukushima (JP); Junichi Nakayama, Fujisawa (JP); Masatoshi Okada, Mito (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 12/379,403

(22) Filed: Feb. 20, 2009

(65) Prior Publication Data

US 2009/0166981 A1 Jul. 2, 2009

Related U.S. Application Data

(62) Division of application No. 11/578,365, filed as application No. PCT/JP2005/005084 on Mar. 22, 2005, now Pat. No. 7,513,506.

(30) Foreign Application Priority Data

| | | |
|---|---|---|
| Apr. 13, 2004 | (JP) | ............................. 2004-117548 |
| Apr. 16, 2004 | (JP) | ............................. 2004-121249 |
| May 11, 2004 | (JP) | ............................. 2004-141041 |

(51) Int. Cl.
  *F16J 15/32* (2006.01)
(52) U.S. Cl. ...................................... 277/353; 277/551
(58) Field of Classification Search ................. 277/353, 277/549, 551, 555, 560, 562, 568, 570, 576–577
  See application file for complete search history.

(56) References Cited

U.S. PATENT DOCUMENTS

| | | | |
|---|---|---|---|
| 3,901,517 A | * | 8/1975 | Heathcott .................... 277/556 |
| 4,132,421 A | | 1/1979 | Corsi et al. .................. 277/565 |
| 5,052,696 A | | 10/1991 | Hatch .......................... 277/562 |
| 5,098,071 A | | 3/1992 | Umetsu .................... 267/64.27 |
| 5,678,828 A | | 10/1997 | Hamaya ..................... 277/346 |
| 6,616,146 B2 | * | 9/2003 | Friend et al. ................. 277/560 |

(Continued)

FOREIGN PATENT DOCUMENTS

EP  1355059  10/2003

(Continued)

Primary Examiner—Vishal Patel
(74) Attorney, Agent, or Firm—Jacobson Holman PLLC

(57) ABSTRACT

There is provided a plunger seal (1) for a fuel injection pump for a direct-injection gasoline engine, in which, even if a resin material is used for a fuel seal member (12), the plunger seal can be made compact, sealing ability is increased, and assembling man-hours can be reduced, and in which set sealing performance can be achieved when a U-shaped elastic member (33) for applying an energizing force in a diametrical direction is used in a groove (41) formed in the fuel seal member (12). The resin fuel seal member (12) and an oil seal member (13) are assembled to form one seal system. Further, when the U-shaped elastic member (33) is installed in the groove (41), an axial position (L1) of an end surface (44a) at the side opposite to the sealed object of a fixing collar (44) formed on an inner peripheral surface of the groove (41) is positioned at the side (B) opposite to the sealed object than the axial position (L2) of a leading end portion (15b) of a seal lip (15) of the fuel seal member (12).

2 Claims, 10 Drawing Sheets

U.S. PATENT DOCUMENTS

| | | | |
|---|---|---|---|
| 6,722,658 B2 * | 4/2004 | Siegrist et al. | 277/436 |
| 6,883,804 B2 * | 4/2005 | Cobb | 277/549 |
| 7,055,825 B2 * | 6/2006 | Watanabe et al. | 277/349 |

FOREIGN PATENT DOCUMENTS

| | | |
|---|---|---|
| JP | 54147360 | 10/1979 |
| JP | 08068370 | 3/1996 |
| JP | 08082372 | 3/1996 |
| JP | 2651407 | 5/1997 |
| JP | 10314630 | 12/1998 |
| JP | 2955822 | 7/1999 |
| JP | 2002013642 | 1/2002 |
| JP | 2003314408 | 11/2003 |
| JP | 2005147317 | 6/2005 |
| WO | WO02099320 | 12/2002 |

\* cited by examiner

PLUNGER SEAL FOR PUMP

CROSS-REFERENCE OF RELATED APPLICATIONS

This application is a divisional of U.S. application Ser. No. 11/578,365, filed Oct. 13, 2006, now U.S. Pat. No. 7,513,506. U.S. application Ser. No. 11/578,365 is a U.S. national phase application of PCT/JP05/005084, filed Mar. 22, 2005, and published in Japanese, all of which are incorporated herein.

BACKGROUND OF THE INVENTION

1. Field of the Invention

The present invention relates to a plunger seal for a pump which is used as a reciprocating seal of a high-pressure fuel pump in a fuel injection pump for a direct-injection gasoline engine, and used for all other oil pressure, air pressure and water pressure equipments.

2. Description of the Conventional Art

The direct-injection gasoline engine is structured such as to directly inject a high-pressure fuel into a cylinder so as to burn for the purpose of a regulation of exhaust gas, an improvement of specific fuel consumption and the like in recent years. Since a high pressure performance is demanded in the fuel injection pump used for directly injecting the high-pressure fuel, a performance standing against a high pressure is demanded in a plunger seal for the pump used in the fuel injection pump.

Conventionally, as the plunger seal for the pump used in the fuel injection pump, there has been known a rubber lip type seal member integrally having a fuel seal lip sealing the fuel such as the gasoline or the like at high pressure in a sealed object side, and an oil seal lip sealing an oil existing in an opposite side to the sealed object for cooling and lubricating (refer to Japanese Unexamined Patent Publication No. 8-68370). However, since a material of the seal lip is constituted by the rubber, there is a problem that a sealing function can not be sufficiently satisfied with respect to a lack of pressure tightness due to the high pressure and a lack of fuel resistance accompanied by an increase of an alcoholic content in the fuel.

Accordingly, there has been proposed a structure in which the fuel seal lip is made of the resin and is independently provided from the rubber oil seal lip, whereby it is possible to maintain the pressure resistance even if the pressure of the high-pressure fuel becomes higher, and it is possible to prevent a swelling and a reduction of hardness and strength with respect to the alcohol contained fuel or the like (refer to the patent document WO 02/099320A1). However, since the fuel seal lip and the oil seal lip are independently provided, an installation space is increased, so that there is a problem that it is impossible to respond to a demand for a compact structure, and it is impossible to secure a stable seal performance with respect to a higher performance requirement of the fuel pump. Further, since a demand for a low cost is increased, it is necessary to respond to this. It is necessary to reduce a number of seals for reducing an assembling man-hour.

Further, there has been known that, when a metal spring having an approximately U-shaped cross section and applying an energizing force in a diametrical direction is installed in a groove formed in the rubber fuel seal lip, a fixing collar for preventing the metal spring from jumping out is provided in an opening portion of the groove (refer to Japanese Patent No. 2651407). However, if the fixing collar is provided in the case that the fuel seal lip is constituted by the resin material, a shape thereof becomes complicated, it is hard to manufacture the seal lip of the resin material by a normally used injection molding machine. Accordingly, there has been proposed that an inner surface of the grove is formed flat while abolishing the fixing collar, in the case that the resin fuel seal lip in which the metal spring having the approximately U-shaped cross section is installed is manufactured by the injection molding machine (refer to Japanese Patent No. 2955822).

Further, as shown in FIG. 16, in the conventional fuel seal lip 101 using the rubber material, a shape of the seal lip 101 is specified by setting angles $\alpha$ and $\beta$ formed by both side surfaces 103 and 104 of the seal lip 101 with respect to a plunger 102 at a time of installing the plunger 102, and a surface pressure gradient P generated in a contact surface of the seal lip 101 at a time of installing the plunger 102 is controlled as shown in FIG. 17, whereby it is possible to control a thickness t of a seal medium interposed between the seal lip 101 and the plunger 102 so as to secure a sealing performance (a leak amount) in accordance with a set seal performance. However, if the material of the fuel seal lip 101 is changed to the resin such as PTFE or the like, the angle $\alpha$ and $\beta$ corresponding to the shape of the seal lip 101 are deformed and changed by use on the basis of a creep characteristic. Accordingly, the surface pressure gradient P generated in the contact surface of the seal lip 101 is changed, and it is hard to secure the seal performance (the leak amount) in accordance with the set value.

SUMMARY OF THE INVENTION

Problem to be Solved by the Invention

The present invention is made by taking the points mentioned above into consideration, and an object of the present invention is to provide a plunger seal for a pump used in a fuel injection pump for a direct-injection gasoline engine, which can achieve a compact structure, an improvement of pressure resistance and sealing performance, a cost reduction and a reduction of an assembling man-hour even if a resin material is used for a fuel seal member for the purpose of the pressure resistance and a heat resistance.

Another object of the present invention is to provide a plunger seal for a pump which can secure a preset sealing performance (leak amount) even if a shape of a seal lip is deformed by use, in the case that a metal spring applying an energizing force in a diametrical direction and having an approximately U-shaped cross section is installed in a groove formed in a fuel seal member using the resin material.

Means for Solving the Problem

In order to achieve the objects mentioned above, in accordance with a first aspect of the present invention, there is provided a plunger seal for a pump, the plunger seal being provided in an annular space between a shaft reciprocating within a high-pressure fuel injection pump and a housing, sealing a high-pressure fuel corresponding to a sealed object and sealing an oil in an opposite side to the sealed object, wherein a seal system is structured by assembling a resin fuel seal member sliding so as to be freely brought into close contact with the shaft and sealing the high-pressure fuel, and an oil seal member positioned at the opposite side to the sealed object from the fuel seal member and mainly sealing the oil.

Further, in accordance with a second aspect of the present invention, there is provided a plunger seal for a pump as recited in the first aspect mentioned above, wherein an elastic member for applying an energizing force in a diametrical direction to a seal lip of the fuel seal member is installed to the fuel seal member.

Further, in accordance with a third aspect of the present invention, there is provided a plunger seal for a pump as recited in the first or second aspect mentioned above, wherein the oil seal member is integrally formed with the fuel seal member made of the resin.

Further, in accordance with a fourth aspect of the present invention, there is provided a plunger seal for a pump as recited in any one of the first to third aspects mentioned above, in which a U-shaped elastic member is installed in a groove open to a sealed object side formed in the fuel seal member, wherein an axial position of a leading end surface of the U-shaped elastic member locked to a fixing collar provided on at least one inner surface side of the groove is positioned at the opposite side to the sealed object from an axial position of a leading end portion of the seal lip formed in the fuel seal member.

Further, in accordance with a fifth aspect of the present invention, there is provided a plunger seal for a pump as recited in the fourth aspect mentioned above, wherein a distance between the axial position of the leading end portion of the seal lip and the axial position of the leading end surface of the U-shaped elastic member locking to the fixing collar is 20% or less of a distance between the axial position of the leading end portion of the seal lip and an axial position of a root portion of the seal lip.

Effect of the Invention

The present invention achieves the following effects.

In the plunger seal for the pump in accordance with the first aspect of the present invention provided with the structure mentioned above, since the material of the fuel seal member is constituted by the resin material, it is possible to sufficiently maintain a pressure resistance even in response to the high pressure requirement of the fuel or the like, the swelling and the reduction of the hardness and the strength are not generated with respect to the lack of fuel oiliness caused by an increase of an alcoholic content in the fuel, and it is possible to improve an abrasion resistance. Further, since the fuel seal member and the oil seal member are assembled without being provided independently so as to structure one seal system, a compact structure is obtained so as to achieve a cost reduction, and it is possible to reduce an assembling man-hour.

Further, in the plunger seal for the pump in accordance with the second aspect, since the elastic member for applying the energizing force in the diametrical direction to the fuel seal member is installed, it is possible to compensate a creep characteristic caused by setting the material of the fuel seal member to the resin, and it is possible to secure a more improved sealing performance.

Further, in the plunger seal for the pump in accordance with the third aspect, since the oil seal member is integrally formed with the resin fuel seal member, it is possible to achieve a more compact structure and a lower cost.

Further, in the plunger seal for the pump in accordance with the fourth aspect, since the axial position, at which the leading end surface of the U-shaped elastic member is locked to the fixing collar provided in the opening portion of the groove, is positioned in the opposite side to the sealed object from the axial position of the leading end portion of the seal lip formed in the fuel seal member, it is possible to make good use of an expanding force of the U-shaped elastic member for controlling the surface pressure gradient generated in the seal lip contact surface, by controlling the distance between the axial position of the leading end portion of the seal lip and the axial position of the leading end surface of the U-shaped elastic member. Accordingly, even in the case that the seal lip shape defined by the angle formed by the contact between the both side surfaces of the seal lip and the shaft is deformed and changed due to the use, on the basis of the use of the elastic material for the fuel seal member, it is possible to control a change level of the surface pressure gradient generated in the seal lip contact surface, and it is possible to secure the preset sealing performance by controlling a thickness of the seal medium interposed between the seal lip and the shaft.

Further, in the plunger seal for the pump in accordance with the fifth aspect, since the distance between the axial position of the leading end portion of the seal lip and the axial position at which the leading end surface of the U-shaped elastic member is locked to the fixing collar is set to be 20% or less of the distance between the axial position of the leading end portion of the seal lip and the axial position of the root portion of the seal lip, it is possible to more easily control the surface pressure gradient generated in the seal lip contact surface, and it is possible to secure the preset seal amount.

Figure 1:
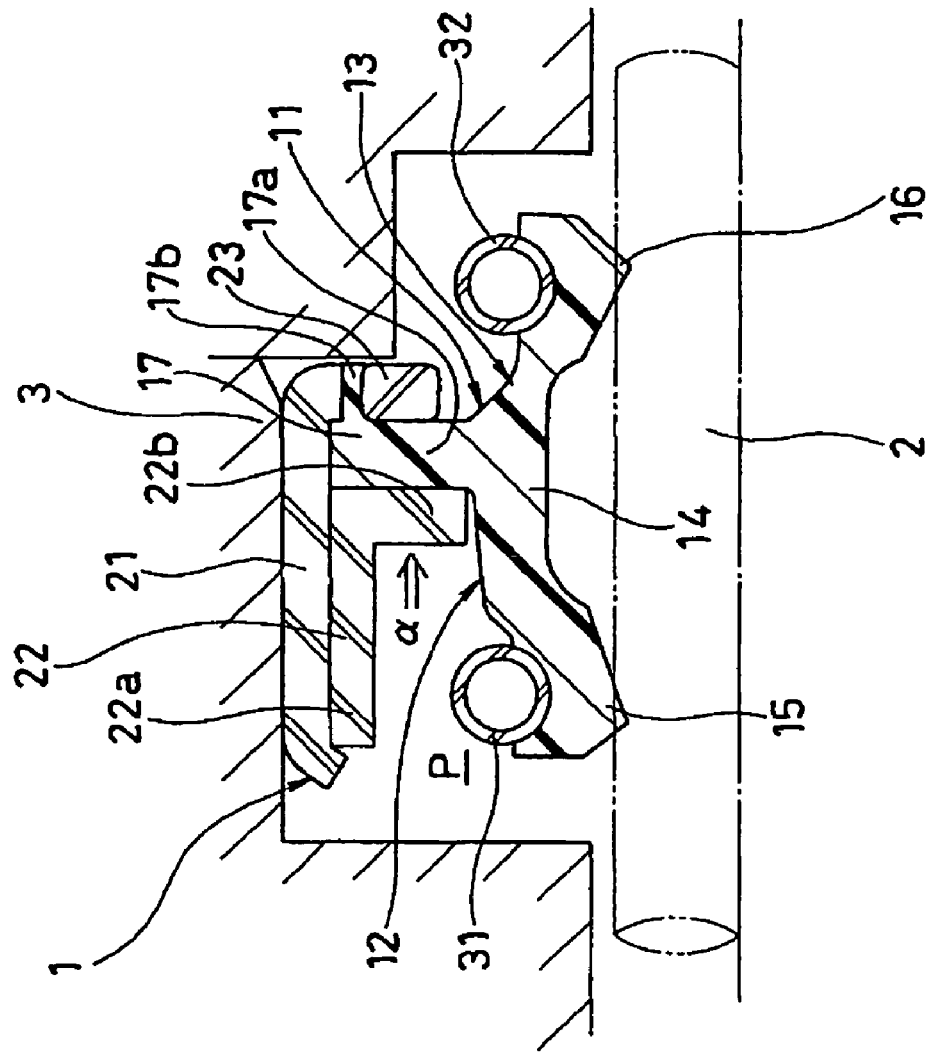
FIG. 1 is a sectional view of a plunger seal for a pump in accordance with a first embodiment of the present invention.

DESCRIPTION OF REFERENCE NUMERALS 1 plunger seal for pump
2 plunger (shaft)
3 housing
11 seal member
12 fuel seal member
13 oil seal member
14 seal lip portion
15, 16 seal lip
15a, 16a sub lip
15b, 16b leading end portion
15c, 16c side surface
17, 18, 19 seal fixing portion
21, 22, 23 metal ring
21a, 22a, 23a cylinder portion
21b, 22b, 23b flange portion
31, 32 coil spring
33 metal spring (elastic member)
41 groove
42, 43 fixing and sealing portion
44 fixing collar
A sealed object side
B opposite side to sealed object

DETAILED DESCRIPTION OF PREFERRED EMBODIMENT

A description will be given below of preferable embodiments in accordance with the invention with reference to the accompanying drawings. In this case, a scope of the invention is not limited to the contents described in the embodiments unless any restrictive description is given.

First Embodiment

FIG. 1 is a sectional view showing a state in which a plunger seal 1 for a pump in accordance with a first embodiment of the present invention is installed to an annular space formed by a plunger 2 corresponding to a shaft reciprocating within a high-pressure fuel injection pump and a housing 3.

The plunger seal 1 for the pump is used in a fuel injection pump for a direct-injection gasoline engine, and has a function of sealing a fuel such as gasoline or the like at high pressure existing in a sealed object side, and a function of sealing an oil existing in an opposite side to the sealed object for cooling and lubricating.

In FIG. 1, the plunger seal 1 for the pump is constituted by a seal member 11, three metal rings 21, 22 and 23 holding the seal member 11, and two coil springs 31 and 32 for applying an energizing force in an axial direction to two seal lips 15 and 16 formed in a seal lip portion 14 of the seal member 11.

Three metal rings 21, 22 and 23 are constituted by the first metal ring 21 fitted to an inner peripheral side of the housing 3, the second metal ring 22 having a cylinder portion 22a fitted to an inner peripheral side of the first metal ring 21 and a flange portion 22b extending toward the plunger 2 from an end portion of an opposite side B to the sealed object in the cylinder portion 22a and formed in an approximately inverse-L shape, and the third metal ring 23 positioned in the opposite side B to the sealed object than the flange portion 22b of the second metal ring 22 and fitted to the housing 3.

The seal member 11 is structured by integrally forming the fuel seal member 12 and the oil seal member 13. The seal member 11 is constituted by the seal lip portion 14 having the fuel side seal lip 15 brought into slidable contact with the plunger 2 to mainly seal the fuel such as gasoline or the like at high pressure and the oil side seal lip 16 brought into slidable contact with the plunger 2 and positioned in the opposite side B to the sealed object than the seal lip 15 to mainly seal the oil for cooling and lubricating, and a seal fixing portion 17 positioned in an outer peripheral side of the seal lip portion 14. Shapes of the fuel side seal lip 15 and the oil side seal lip 16 are both formed in an approximately inverse-triangular cross sectional shape in which a center leading end portion protrudes in a diametrical direction, and concave portions for installing the coil springs 31 and 32 are formed in outer peripheral sides of leading end portions of the seal lips 15 and 16. The seal fixing portion 17 has a flange portion 17a extending in an outer peripheral direction from the seal lip portion 14 and a cylinder portion 17b extending to the opposite side B to the sealed object from a side surface of the flange portion 17a, and is retained by the first metal ring 21, the second metal ring 22 and the third metal ring. As a material of the seal member 11, a resin such as PTFE or the like which is excellent in a pressure resistance is employed.

Two coil springs 31 and 32 are respectively installed to the concave portions formed in the outer peripheral sides of the fuel side seal lip 15 and the oil side seal lip 16, and apply energizing forces in a diametrical direction to the respective seal lips 15 and 16.

In the plunger seal 1 for the pump provided with the structure mentioned above, since the material of the seal member 11 having the seal lip 15 for sealing the fuel and the seal lip 16 for sealing the oil is constituted by the resin material, and they are integrally formed so as to structure one seal system, a pressure resistance and an oil resistance are excellent, and the number of parts is reduced, and it is possible to achieve a compact structure, a cost reduction and a reduction of an assembling man-hour. Further, when a space P formed with respect to the housing 3 in the side of the seal lip 15 for sealing the fuel comes to a high pressure, the retaining force of the seal fixing portion 17 is increased by pressing the flange portion 22b of the metal ring 22 attached in the inverse-L shape to the opposite side B to the sealed object from the sealed object side A in a direction of an arrow α. Accordingly, it is possible to improve a sealing performance.

Second Embodiment

Figure 2:
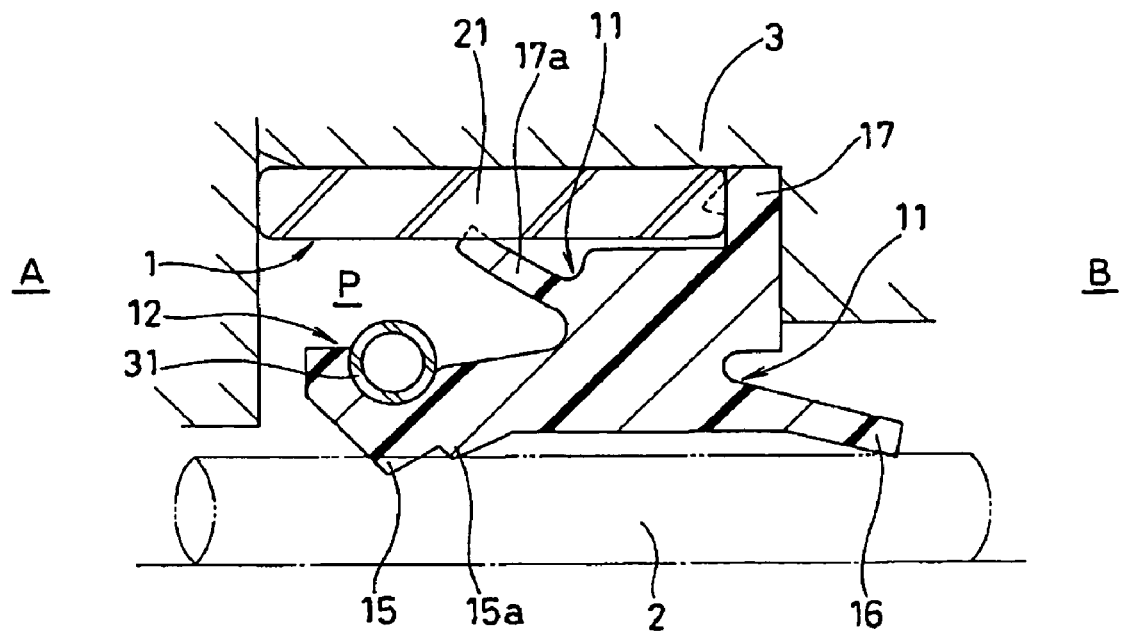
FIG. 2 is a sectional view of a plunger seal for a pump in accordance with a second embodiment of the present invention.

FIG. 2 is a sectional view of a main portion of a plunger seal 1 for a pump in accordance with a second embodiment of the present invention.

In the plunger seal 1 for the pump in FIG. 2, the seal fixing portion 17 is pinched by an end surface formed by an expanded end surface of the housing 3 and the first metal ring 21 as is different from the first embodiment, and has a seal lip 17a for sealing an inner peripheral side of the metal ring 21. The other metal rings are not used. The fuel side seal lip 15 has a sub lip 15a. Further, since the shape of the oil side seal lip 16 is formed in a rectangular cross sectional shape and the sealing performance is secured by contracting the oil side seal lip 16 toward the opposite side B to the sealed object, no coil spring is used.

In the structure mentioned above, since the material of the seal member 11 having the seal lip 15 for sealing the fuel and the seal lip 16 for sealing the oil is constituted by the resin material, and they are integrally formed so as to structure one seal system, a pressure resistance and an oil resistance are excellent, and the number of parts is reduced, and it is possible to achieve a compact structure, a cost reduction and a reduction of an assembling man-hour. Further, since the coil spring is not used in the oil side seal lip 16, and only one metal ring 21 is used, it is possible to achieve a further cost reduction and a further reduction of an assembling man-hour on the basis of the reduction of the number of the parts. Further, since the seal lip 17a for sealing the inner peripheral side of the metal ring 21 is formed in the seal fixing portion 17 so as to improve an air tightness, the pressure of the space P is further increased at a time when the space P formed by the housing 3 in the side of the seal lip 15 for sealing the fuel comes to a high pressure. Accordingly, it is possible to increase a fastening force of the seal lip 15 so as to improve a sealing performance.

Third Embodiment

Figure 3:
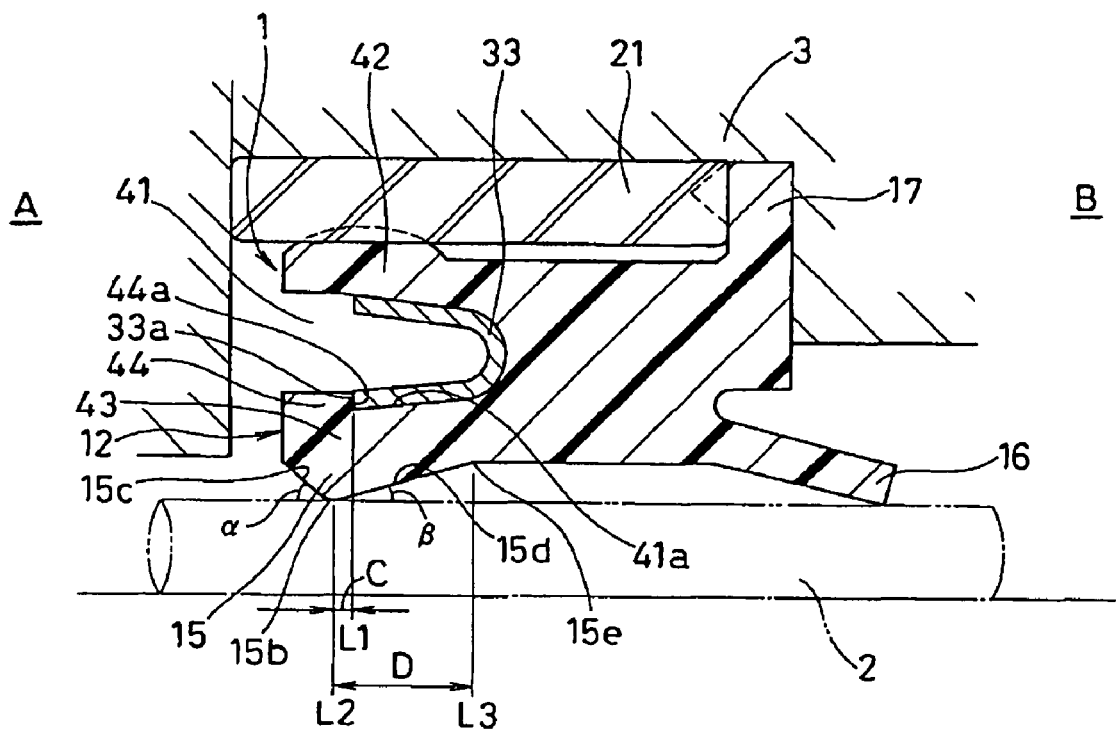
FIG. 3 is a sectional view of a plunger seal for a pump in accordance with a third embodiment of the present invention.

FIG. 3 is a sectional view of a main portion of a plunger seal 1 for a pump in accordance with a third embodiment of the present invention.

In the plunger seal 1 for the pump in FIG. 3, the shape of the fuel seal member 12 is different as is different from the second embodiment. In other words, the fuel seal member 12 is formed in an approximately inverse-U cross sectional shape having a groove 41 open to the sealed object side A, and is constituted by an outer peripheral fixing and sealing portion 42 fitted to the metal ring 21 fitted to the inner peripheral surface of the housing 2 and an inner peripheral fixing and sealing portion 43 having the seal lip 15 brought into slidable contact with the plunger 3. A metal spring 33 for applying an energizing force in a diametrical direction is inward provided in the groove 41. In this case, the sub lip 15a is not provided.

The metal spring 33 is formed in an approximately U-shaped cross section, and an end surface 33a in an inner peripheral side leading end portion is locked to an end surface 44a in an opposite side to the sealed object of the fixing collar 44 formed in an opening portion of the groove 41 and in a plunger side inner surface 41a.

Figure 4:
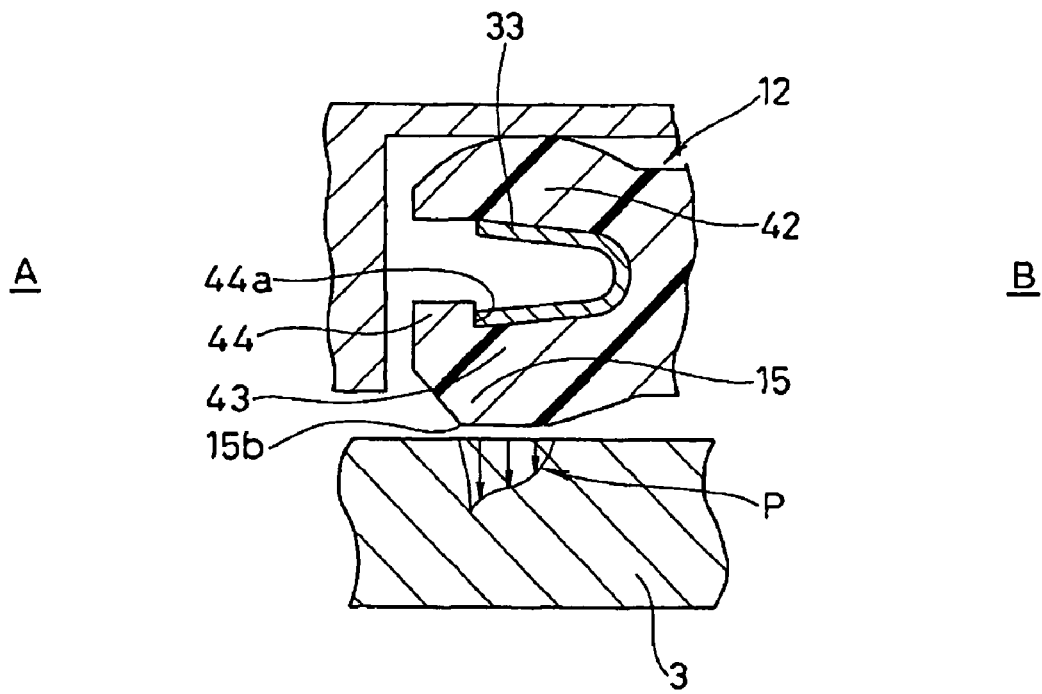
FIG. 4 is an explanatory view of a surface pressure gradient in FIG. 3.

An axial position L1 at which the end surface 44a of the fixing collar 44 is formed in the opposite side A to the sealed object (a right side in the drawing) than an axial position L2 of the leading end portion 15b of the seal lip 15. Accordingly, the structure is made such that an expanding force of the metal spring 33 applied to the seal lip 15 is positively utilized for controlling the surface pressure gradient P generated on the contact surface of the seal lip 15 shown in FIG. 4, by controlling an axial distance C between the axial position L1 of the end surface 44a of the fixing collar 44 and the axial position L2 of the leading end portion 15b of the seal lip 15.

In the structure mentioned above, it is possible to achieve the same operations and effects as those of the second embodiment. Further, since the fuel seal member 12 is made of the resin material, it is possible to suppress a change level of the surface pressure gradient P by controlling the distance C between the axial position L1 where the end surface 44a of the fixing collar 44 is formed, and the axial position L2 of the leading end portion 15b of the seal lip 15, even in the case that angles α and β formed by both side surfaces 15c and 15d of the seal lip 15 and the plunger 2 and defining the shape of the seal lip 15 are deformed and changed due to a creep or an abrasion by use.

In this case, the fixing collar 44 formed in the inner surface of the groove 41 may be provided at the housing 3 side in place of the plunger 2 side.

Further, it is preferable that the distance C between the axial position L2 of the leading end portion 15b of the seal lip 15 and the axial position L1 where the end surface 44a of the fixing collar 44 is formed is 20% or less of the distance D between the axial position L2 of the leading end portion 15b of the seal lip 15 and an axial position L3 of a root portion 15e of the seal lip 15, however, the distance is not limited to this range.

Further, the description is given of the U-shaped metal spring 33, however, the kind of the spring is not limited to the metal spring, but every kind of spring may be employed.

Fourth Embodiment

Figure 5:
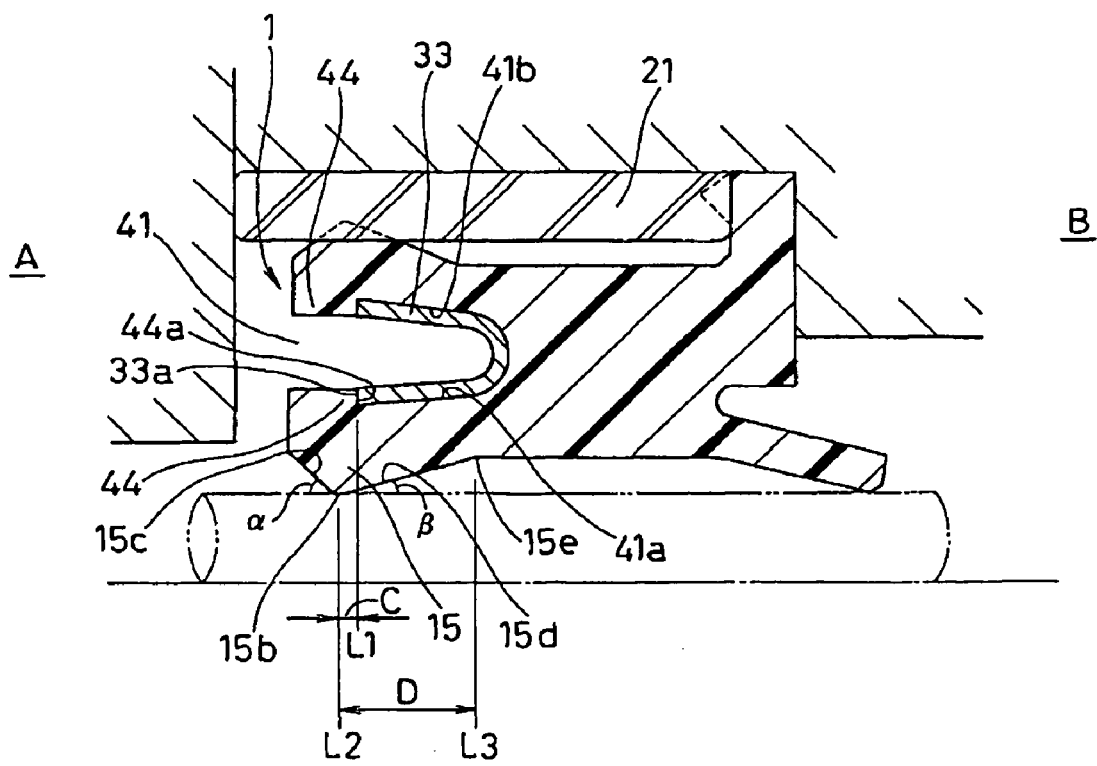
FIG. 5 is a sectional view of a plunger seal for a pump in accordance with a fourth embodiment of the present invention.

FIG. 5 is a sectional view of a main portion of a plunger seal 1 for a pump in accordance with a fourth embodiment of the present invention.

In the plunger seal 1 for the pump in FIG. 5, the fixing collar 44 formed in the opening portion side of the groove 41 is formed in both sides of the plunger side inner surface 41a and a housing side inner surface 41b, as is different from the third embodiment. The other structures are the same as the third embodiment. Accordingly, in the structure mentioned above, it is possible to obtain the same operations and effects as those of the third embodiment.

Fifth Embodiment

Figure 6:
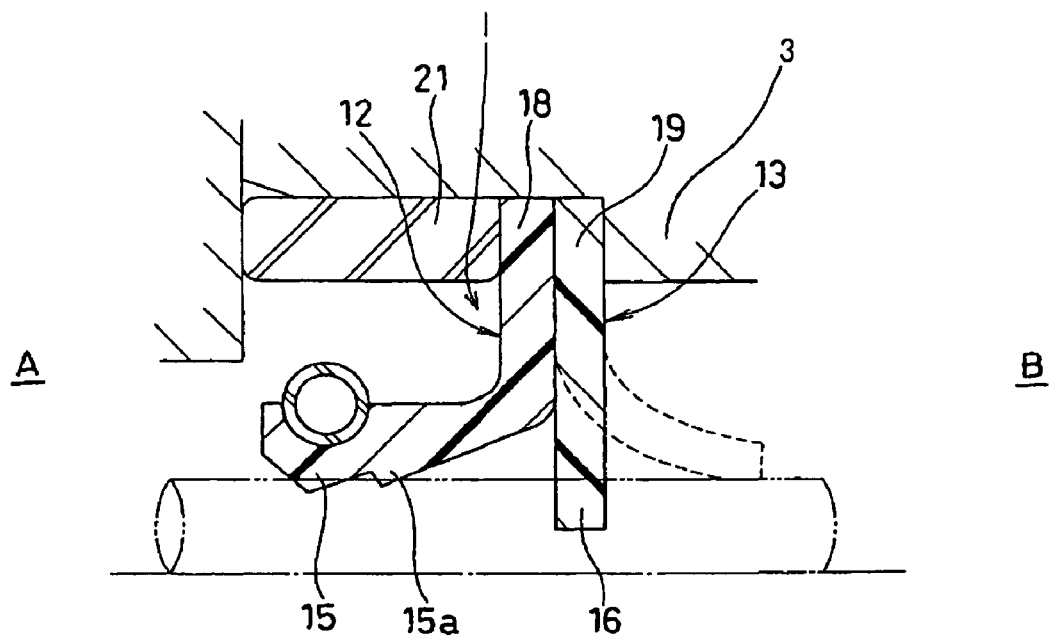
FIG. 6 is a sectional view of a plunger seal for a pump in accordance with a fifth embodiment of the present invention.

FIG. 6 is a sectional view of a main portion of a plunger seal 1 for a pump in accordance with a fifth embodiment of the present invention.

In the plunger seal 1 for the pump in FIG. 6, the seal member 11 is formed by the resin in such a manner that the fuel seal member 12 and the oil seal member 13 are independent, as is different from the first embodiment. The seal fixing portion 18 of the fuel seal member 12 and the seal fixing portion 19 of the oil seal member 13, which are assembled to each other, the housing are pinched by an expanded end surface of the housing 3 and the first metal ring 21, and the fuel seal member 12 has a sub lip 15a. The shape of the oil seal member 13 is formed in a rectangular cross sectional shape, and an energizing force is applied by bringing the seal lip 16 into a slidable contact with the peripheral surface of the plunger 2 in such a manner as to bend the seal lip 16 toward the opposite side B to the sealed object at the time of installation. Accordingly, the coil spring is not used.

In the structure mentioned above, since the fuel side seal lip 15 and the oil side seal lip 16 are made of the resin, it is possible to obtain excellent pressure resistance and oil resistance. Further, since the fuel seal member 12 and the oil seal member 13 are assembled so as to structure one seal system, the coil spring is not used in the oil seal member 13 and only one metal ring 21 is provided, the number of the parts is reduced at a time of assembling, and it is possible to achieve a compact structure, a cost reduction and a reduction of an assembling man-hour. Further, since the shape of the oil seal member 13 is not complicated so as to be easily processed, it is possible to achieve a further cost reduction.

Sixth Embodiment

Figure 7:
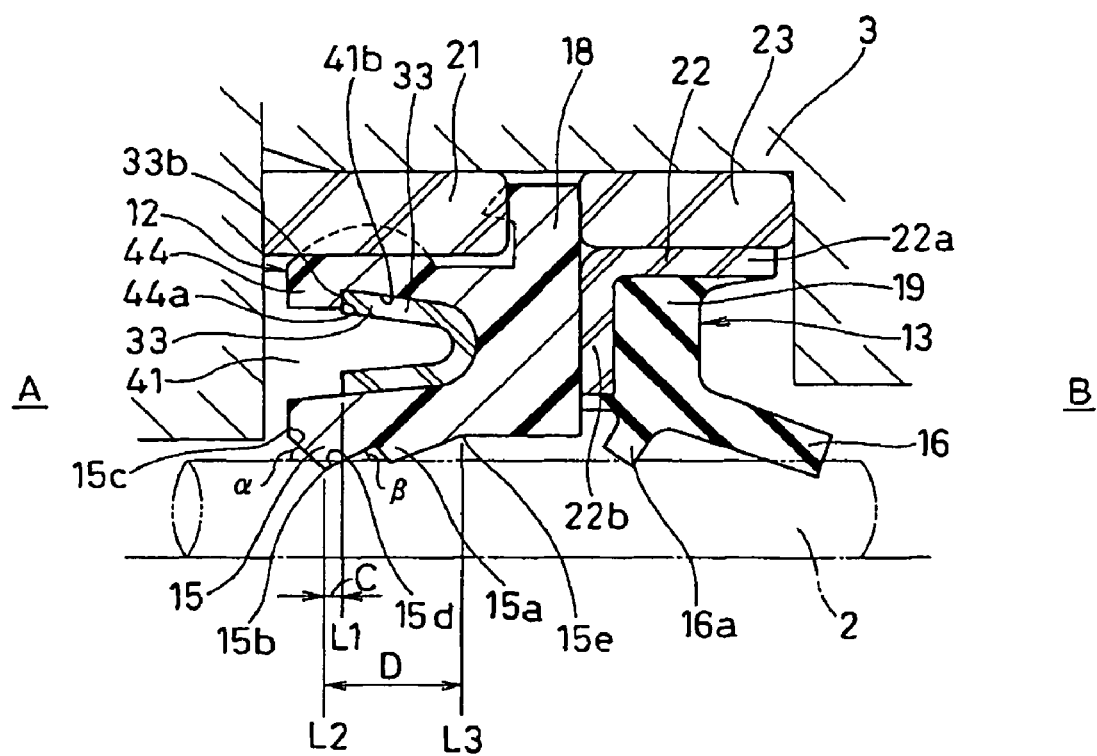
FIG. 7 is a sectional view of a plunger seal for a pump in accordance with a sixth embodiment of the present invention.

FIG. 7 is a sectional view of a main portion of a plunger seal 1 for a pump in accordance with a sixth embodiment of the present invention.

In the plunger seal 1 for the pump in FIG. 7, the fuel seal member 12 is formed in an approximately U-shaped cross section and is made of a resin, the seal fixing portion 18 is pinched by the first metal ring 21 and the third metal ring 23 fitted to the housing 3, the energizing force in the diametrical direction is applied by the U-shaped metal spring 33 provided within the groove 41 open to the sealed object side, and the sub lip 15a is provided. As the used resin material, the resin such as the PTFE or the like having an excellent pressure resistance is preferable. Further, the oil seal member 13 is made of a rubber, and the seal fixing portion 19 is adhered by vulcanization to an inner side of the second metal ring 22 made of the rubber and formed in an approximately inverse-L shape. The seal lip 16 is integrally formed with the seal fixing portion 19, is structured such as to be contracted toward the opposite side to the sealed object while having a rectangular cross sectional shape so as to secure a sealing performance, and is provided with a sub lip 16a in the sealed object side A. The flange portion 22b of the second metal ring 22 supports the fuel seal member 12 at the sealed object side, and the cylinder portion 22a is fitted to the inner peripheral side of the third metal ring 23. As a used rubber material, a nitrile rubber, a hydrogenated nitrile rubber, an acrylic rubber, a fluorine-contained rubber, and a silicone rubber are preferable, however, other synthetic rubbers may be employed.

In the structure mentioned above, since the material of the fuel seal member 12 is constituted by the resin material, it is possible to obtain the excellent pressure resistance and oil resistance. Further, since the material of the oil seal member 13 is constituted by the rubber, it is possible to obtain the excellent sealing performance. Since the fuel seal member 12 and the oil seal member 13 are assembled so as to structure one seal system, and the coil spring is not used in the oil seal member 13, the number of the parts is reduced at a time of installing, and it is possible to achieve a compact structure, a cost reduction and a reduction of an assembling man-hour. Further, since the fuel seal member 12 is fixed by the seal fixing portion 18 being pinched, and is also supported by the flange portion 22b of the second metal ring 22 to which the seal fixing portion 19 of the oil seal member 12 is adhered by vulcanization, behaviors of both the seal members 12 and 13 in the annular space are small. Accordingly, it is possible to obtain a stable sealing performance under a condition of a high frequency oscillation at a high pressure.

Further, in the same manner as the third embodiment, the fixing collar 44 may be provided to protrude on the housing side inner surface 41b in the opening portion of the groove 41, and an outer peripheral side leading end surface 33b of the U-shaped metal spring 33 may be locked to the end surface 44a in the opposite side to the sealed object.

In this case, the axial position L1, at which the end surface 44a of the fixing collar 44 is formed, is formed at the opposite side B to the sealed object (right side of the drawing) from the axial position L2 of the leading end portion 15b of the seal lip 15. Accordingly, the structure is made such that the expanding force of the metal spring 33 applied to the seal lip 15 is positively utilized for controlling the surface pressure gradient P generated on the contact surface of the seal lip 15 shown in FIG. 4, by controlling the distance C between the axial position L1 of the end surface 44a of the fixing collar 44 and the axial position L2 of the leading end portion 15b of the seal lip 15.

In this structure, since the fuel seal member 12 is made of the resin, it is possible to suppress the change level of the surface pressure gradient P by controlling the distance C between the axial position L1 at which the end surface 44a of the fixing collar 44 is formed, and the axial position L2 of the leading end portion 15b of the seal lip 15, even in the case that the angles α and β formed by both the side surfaces 15c and 15d and the plunger 3 defining the shape of the seal lip 15 are deformed and changed due to the creep or the abrasion by use.

In this case, it is preferable that the distance C between the axial position L2 of the leading end portion 15b of the seal lip 15, and the axial position L1 at which the end surface 44a of the fixing collar 44 is formed is 20% or less of the distance D between the axial position L2 of the leading end portion 15b of the seal lip 15 and the axial position L3 of the root portion 15e of the seal lip 15, however, the distance C is not limited to this range.

Seventh Embodiment

Figure 8:
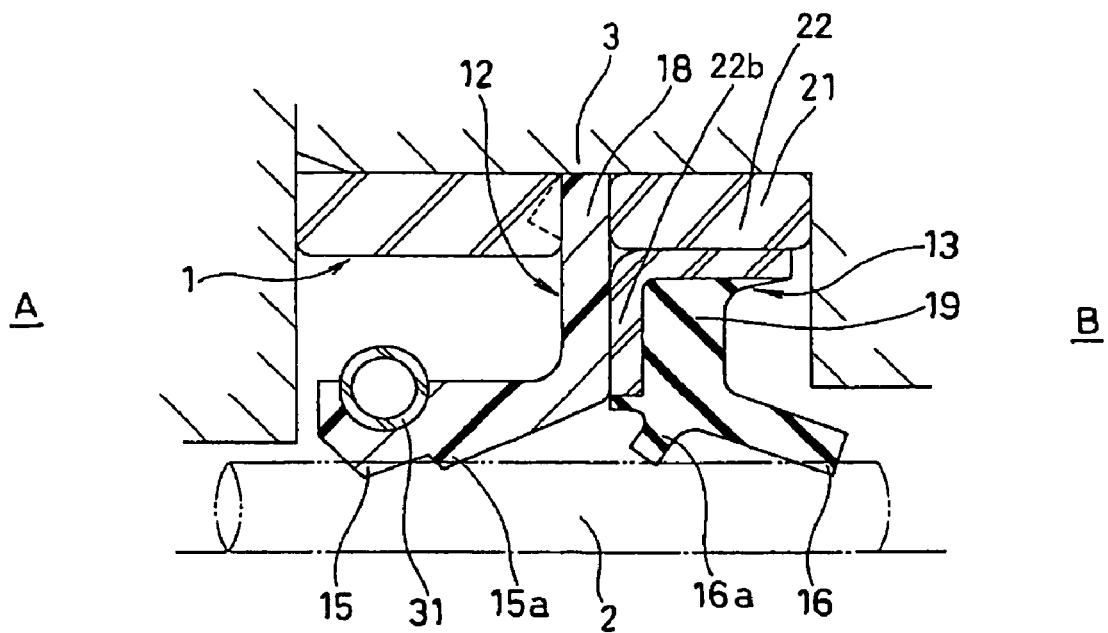
FIG. 8 is a sectional view of a plunger seal for a pump in accordance with a seventh embodiment of the present invention.

FIG. 8 is a sectional view of a main portion of a plunger seal 1 for a pump in accordance with a seventh embodiment of the present invention.

In the plunger seal 1 for the pump in FIG. 8, the shape of the fuel seal member 12 is different as is different from the sixth embodiment, and the coil spring 31 is used for applying the energizing force.

In the structure mentioned above, since the material of the lip of the fuel seal member 12 is constituted by the resin material, it is possible to obtain excellent pressure resistance and oil resistance. Further, since the material of the oil seal member 13 is constituted by the rubber, it is possible to obtain an excellent sealing performance. Since the fuel seal member 12 and the oil seal member 13 are assembled so as to structure one seal system, and the coil spring is not used in the oil seal member 13, the number of the parts is reduced at a time of installing, and it is possible to achieve a compact structure, a cost reduction and a reduction of an assembling man-hour. Further, since the fuel seal member 12 is fixed by the seal fixing portion 18 being pinched, and is also supported by the flange portion 22b of the second metal ring 22 to which the seal fixing portion 19 of the oil seal member 13 is adhered by vulcanization, the behaviors of both the seal members 12 and 13 in the annular space are small. Accordingly, it is possible to obtain a stable sealing performance even under a condition of a high frequency oscillation at a high pressure.

Eighth Embodiment

Figure 9:
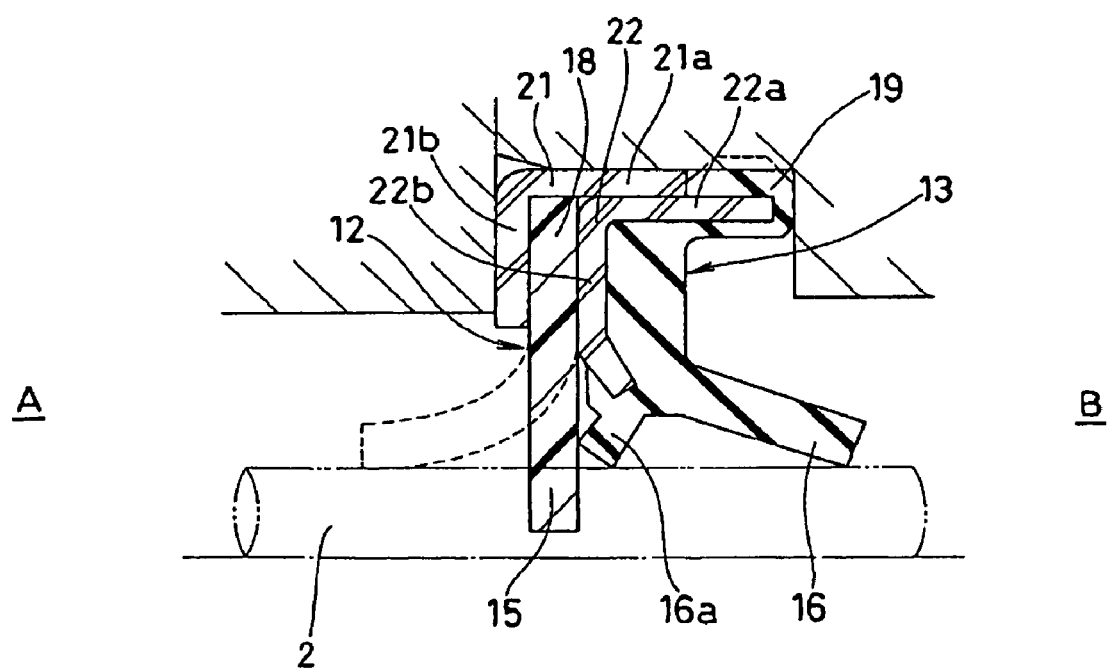
FIG. 9 is a sectional view of a plunger seal for a pump in accordance with an eighth embodiment of the present invention.

FIG. 9 is a sectional view of a main portion of a plunger seal 1 for a pump in accordance with an eighth embodiment of the present invention.

In the plunger seal 1 for the pump in FIG. 9, since the fuel seal member 12 is formed in a rectangular shape and made of a resin, the seal fixing portion 18 is pinched by the flange portion 21b of the first metal ring 21 and the flange portion 22b of the second metal ring 22, and an energizing force is applied by bringing the seal lip 15 into slidable contact with the peripheral surface of the plunger 2 in such a manner as to bend the seal lip 15 to the sealed subject side A at a time of installing, the coil spring is not used. The oil seal member 13 is made of a rubber, the shape of the seal lip 16 is formed in a rectangular cross sectional shape, and is contracted toward the opposite side B to the sealed object, and the sub lip 16a is provided. The seal fixing portion 19 is adhered by vulcanization to the second metal ring 22 in such a manner as to cover the cylinder portion 22a of the second metal ring 22. The cylinder portion 22a of the second metal ring 22 is fitted to the inner peripheral side of the cylinder portion 21a of the first metal ring 21 in the sealed object side A, and is fitted to the housing 3 via the seal fixing portion 19 covering the cylinder portion 22a of the second metal ring 22 in the opposite side B to the sealed object, and the flange portion 22b is brought into contact with the seal fixing portion 18 of the fuel seal member 12 in the sealed object side A.

In the structure mentioned above, since the material of the fuel seal member 12 is constituted by the resin, it is possible to obtain excellent pressure resistance and oil resistance. Further, since the material of the oil seal member 13 is constituted by the rubber, it is possible to obtain an excellent sealing performance. Further, since the fuel seal member 12 and the oil seal member 13 are assembled so as to structure one seal system, and the coil spring is not used in both the seal members 12 and 13, the number of the parts is reduced at a time of assembling, and it is possible to achieve a compact structure, a cost reduction and a reduction of an assembling man-hour. Particularly, since the shape of the fuel seal member 12 is not complicated and the fuel seal member 12 is easily processed, it is possible to obtain a great effect of the cost reduction.

Ninth Embodiment

Figure 10:
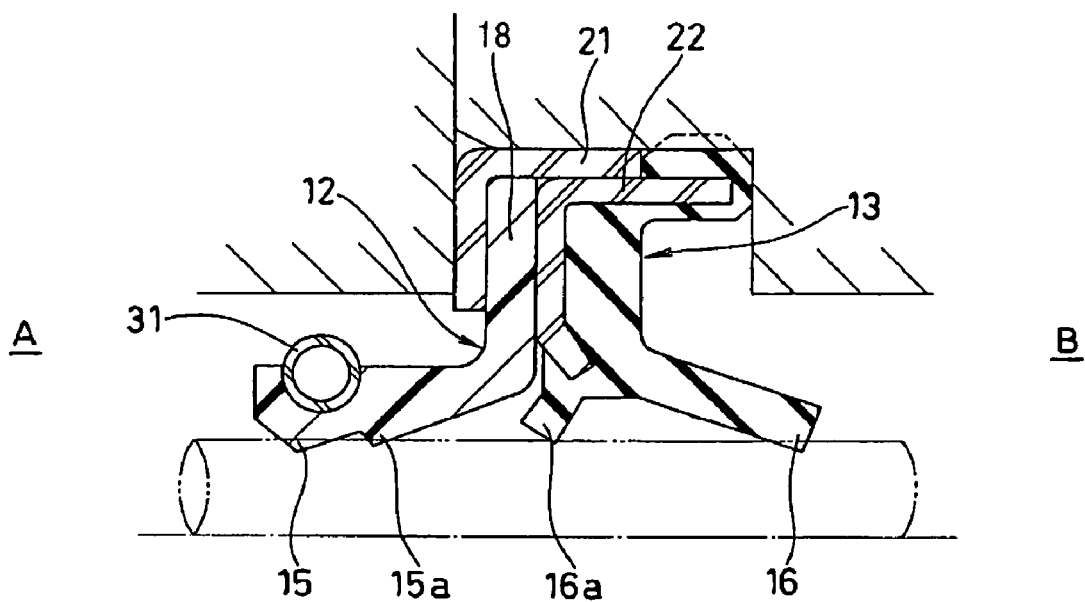
FIG. 10 is a sectional view of a plunger seal for a pump in accordance with a ninth embodiment of the present invention.

FIG. 10 is a sectional view of a main portion of a plunger seal 1 for a pump in accordance with a ninth embodiment of the present invention.

In the plunger seal 1 for the pump in FIG. 10, the shape of the fuel seal member 12 is different from the eighth embodiment. The fuel seal member 12 has the seal lip 15 extending to the sealed object side A from the inner peripheral side end portion of the seal fixing portion 18 and formed in an approximately inverse-triangular cross sectional shape in which a center leading end portion protrudes in a diametrical direction, and the sub lip 15a positioned in the opposite side to the sealed object therefrom, and the coil spring 31 for applying an energizing force in a diametrical direction is installed to a concave portion formed in an outer peripheral side of the seal lip 15.

In the structure mentioned above, since the material of the fuel seal member 12 is constituted by the resin, it is possible to obtain excellent pressure resistance and oil resistance. Further, since the material of the oil seal member 13 is constituted by the rubber, it is possible to obtain an excellent sealing performance. Further, since the fuel seal member 12 and the oil seal member 13 are assembled so as to structure one seal system, and the coil spring is not used in the oil seal member 13, the number of the parts is reduced at a time of assembling, and it is possible to achieve a compact structure, a cost reduction and a reduction of an assembling man-hour.

Tenth Embodiment

Figure 11:
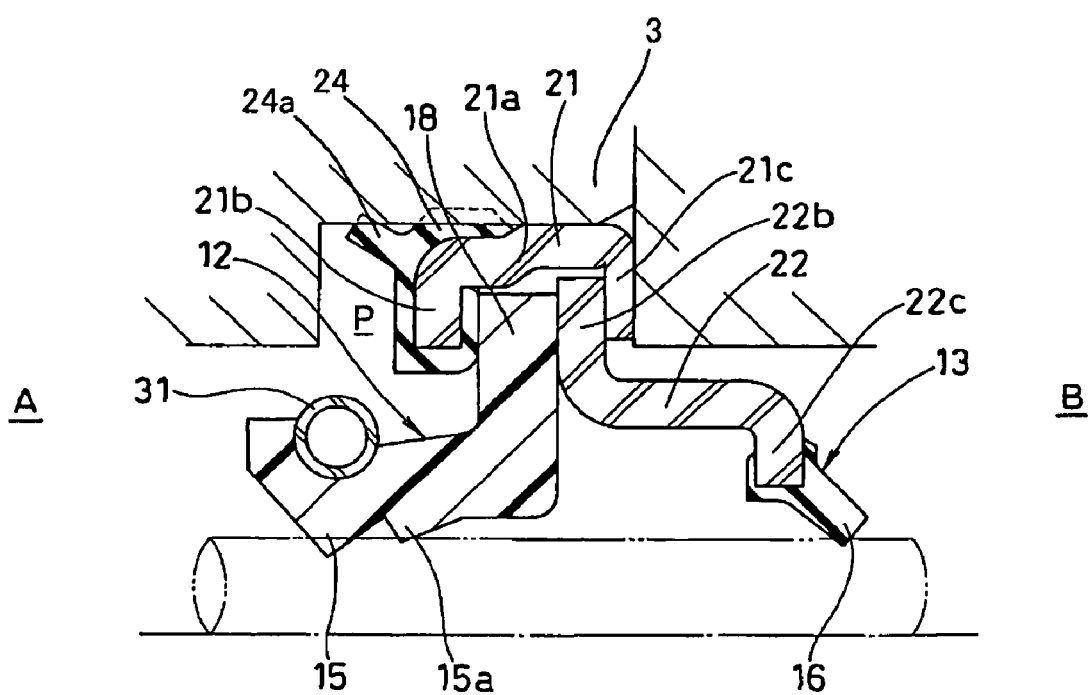
FIG. 11 is a sectional view of a plunger seal for a pump in accordance with a tenth embodiment of the present invention.

FIG. 11 is a sectional view of a main portion of a plunger seal 1 for a pump in accordance with a tenth embodiment of the present invention.

In the plunger seal 1 for the pump in FIG. 11, the fuel seal member 12 is formed by a resin material, and the seal fixing portion 18 and the seal lip 15 are integrally formed. The seal lip 15 has the seal the sub lip 15a extending to the sealed object side A from the inner peripheral side of the seal fixing portion 18, formed in an approximately inverse-triangular cross sectional shape in which a center leading end portion protrudes in a diametrical direction, and provided in the opposite side to the sealed object. Further, the coil spring 31 is installed to an outer peripheral side of the seal lip 15 for applying an energizing force. The oil seal member 13 is constituted by the rubber seal lip 16 which is adhered by vulcanization to a leading end portion of an inner peripheral side flange portion 22c of a step-shaped second metal ring 22. A shape of a leading end portion of the seal lip 16 is formed in a rectangular cross sectional shape, and is contracted toward the opposite side B to the sealed object so as to secure a sealing performance. The seal fixing portion 18 of the fuel seal member 12 and the outer peripheral side flange portion 22b of the second metal ring to which the seal lip 16 is adhered are pinched by the flange portions 21b and 21c in both sides of the first metal ring 21 formed in an approximately C-shaped cross section. The cylinder portion 21a of the first metal ring 21 has a step in a center portion, a large-diameter cylinder portion at the opposite side B to the sealed object is directly fitted to the housing 3, and a small-diameter cylinder portion at the sealed object side A is fitted to the housing 3 via a fixing and sealing portion 24 adhered in such a manner as to cover the flange portion 21b at the sealed object side A. The fixing and sealing portion 24 is integrally provided with a seal lip 24a extending to the sealed object side A and brought into slidable contact with the inner peripheral side end surface of the housing.

In the structure mentioned above, since the material of the fuel seal member 12 is constituted by the resin, it is possible to obtain excellent pressure resistance and oil resistance. Further, since the material of the oil seal member 13 is constituted by the rubber, it is possible to obtain an excellent sealing performance. Further, since the fuel seal member 12 and the oil seal member 13 are assembled so as to structure one seal system, and the coil spring is not used in the oil seal member 13, the number of the parts is reduced at a time of assembling, and it is possible to achieve a compact structure, a cost reduction and a reduction of an assembling man-hour. Further, since the seal lip 24a for sealing the inner peripheral end surface of the housing 3 is formed in the fixing and sealing portion 24 and an air tightness is improved, it is possible to further increase the pressure in the space P at a time when the space P formed by the fuel seal member 12 and the housing 3 comes to a high pressure. Accordingly, it is possible to increase a fastening force of the seal lip 15, and it is possible to improve a sealing performance.

Eleventh Embodiment

Figure 12:
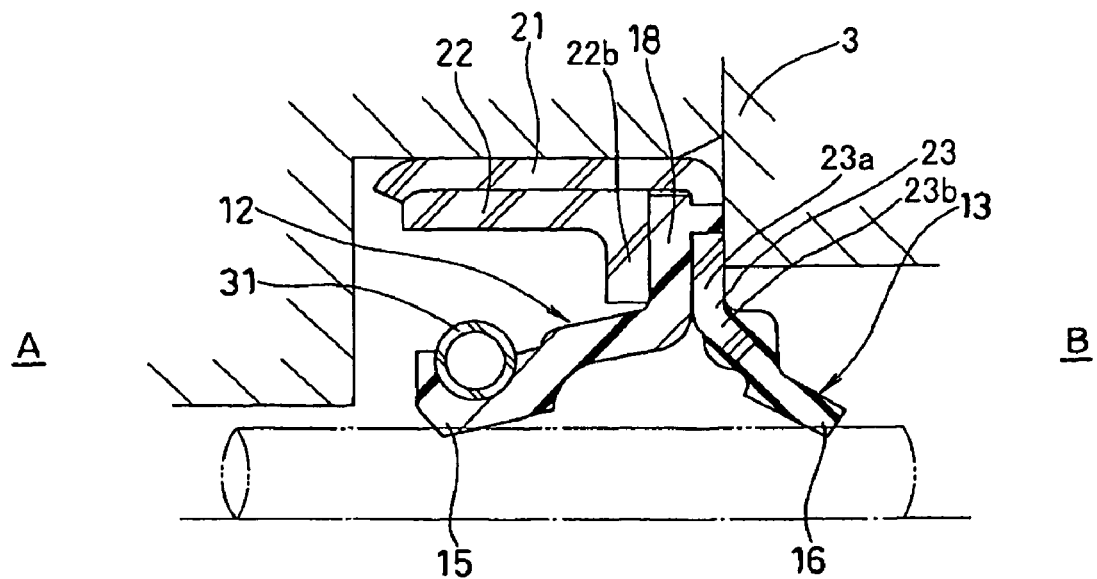
FIG. 12 is a sectional view of a plunger seal for a pump in accordance with an eleventh embodiment of the present invention.

FIG. 12 is a sectional view of a main portion of a plunger seal 1 for a pump in accordance with an eleventh embodiment of the present invention.

In the plunger seal 1 for the pump in FIG. 12, the fuel seal member 12 is formed by a resin material, and the seal fixing portion 18 and the seal lip 15 are integrally formed. The seal lip 15 extends to the sealed object side A from the inner peripheral side of the seal fixing portion 18, and is formed in an approximately inverse-triangular cross sectional shape in which a center leading end portion protrudes in a diametrical direction. Further, the coil spring 31 is installed to an outer peripheral side of the seal lip 15 for applying an energizing force. The oil seal member 13 is constituted by the rubber seal lip 16 which is adhered by vulcanization to a leading end portion of a slope portion 23b extending diagonally toward the opposite side B to the sealed object from an inner peripheral side end portion of a flange portion 23a of a third metal ring 23. A shape of a leading end portion of the seal lip 16 is formed in a rectangular cross sectional shape, and is contracted toward the opposite side B to the sealed object so as to secure a sealing performance. The seal fixing portion 18 of the fuel seal member 12 and the flange portion 23a of the third metal ring 23 to which the seal lip 16 is adhered are held by a first metal ring 21 fitted to the inner peripheral end surface of the housing 3, a flange portion 22b of the second metal ring 22 fitted to an inner peripheral surface of the first metal ring 21, and an end surface of the expanded housing 3.

In the structure mentioned above, since the material of the fuel seal member 12 is constituted by the resin, it is possible to obtain excellent pressure resistance and oil resistance. Further, since the material of the oil seal member 13 is constituted by the rubber, it is possible to obtain an excellent sealing performance. Further, since the fuel seal member 12 and the oil seal member 13 are assembled so as to structure one seal system, and the coil spring is not used in the oil seal member 13, the number of the parts is reduced at a time of assembling, and it is possible to achieve a compact structure, a cost reduction and a reduction of an assembling man-hour.

Twelfth Embodiment

Figure 13:
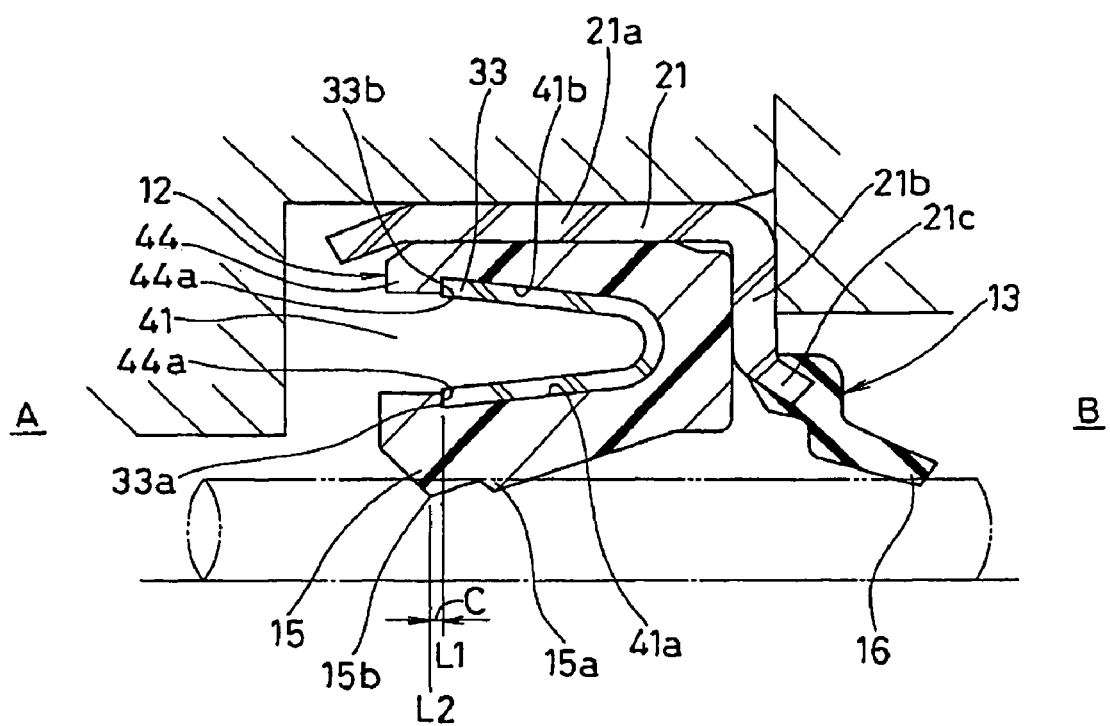
FIG. 13 is a sectional view of a plunger seal for a pump in accordance with a twelfth embodiment of the present invention.

FIG. 13 is a sectional view of a main portion of a plunger seal 1 for a pump in accordance with a twelfth embodiment of the present invention.

In the plunger seal 1 for the pump in FIG. 13, the fuel seal member 12 is formed in an approximately U shape, is made of a resin, and is fitted to an inner periphery of the first metal ring 21. A U-shaped metal spring 33 for applying an energizing force in a diametrical direction is inward provided in an inner portion of a groove 41 open to the sealed object side A, and the fuel seal member 12 has a sub lip 15a. The oil seal member 13 is constituted by the rubber seal lip 16 which is adhered by vulcanization to a leading end portion of a slope portion 21c extending diagonally toward the opposite side B to the sealed object from the inner peripheral side end portion of the flange portion 21b of the first metal ring 21. A shape of the leading end portion of the seal lip 16 is formed in a rectangular cross sectional shape, and is contracted toward the opposite side B to the sealed object so as to secure a sealing performance.

In the structure mentioned above, since the material of the fuel seal member 12 is constituted by the resin, it is possible to obtain excellent pressure resistance and oil resistance. Further, since the material of the oil seal member 13 is constituted by the rubber, it is possible to obtain an excellent sealing performance. Further, since the fuel seal member 12 and the oil seal member 13 are assembled so as to structure one seal system, and the coil spring is not used in the oil seal member 13, the number of the parts is reduced at a time of assembling, and it is possible to achieve a compact structure, a cost reduction and a reduction of an assembling man-hour.

Further, in the same manner as the fourth embodiment, the fixing collars 44 may be provided to protrude on both side inner surfaces 41a and 41b in the opening portion of the groove 41, and the leading end surfaces 33a and 33b of the U-shaped metal spring 33 may be locked to the end surfaces 44a at the opposite side to the sealed object of the fixing collars 44.

In this case, the axial position L1, at which the end surfaces 44a of the fixing collars 44 are formed, is formed at the opposite side B to the sealed object (right side of the drawing) from the axial position L2 of the leading end portion 15b of the seal lip 15. Accordingly, the structure is made such that the expanding force of the metal spring 33 applied to the seal lip 15 is positively utilized for controlling the surface pressure gradient P generated on the contact surface of the seal lip 15 shown in FIG. 13, by controlling the distance C between the axial position L1 of the end surfaces 44a of the fixing collars 44 and the axial position L2 of the leading end portion 15b of the seal lip 15.

In this structure, since the fuel seal member 12 is made of the resin, it is possible to suppress the change level of the surface pressure gradient P by controlling the distance C between the axial position L1 at which the end surfaces 44a of the fixing collars 44 are formed, and the axial position L2 of the leading end portion 15b of the seal lip 15, even in the case that the angles α and β formed by both the side surfaces 15c and 15d and the plunger 3 defining the shape of the seal lip 15 are deformed and changed due to the creep or the abrasion by use.

Thirteenth Embodiment

Figure 14:
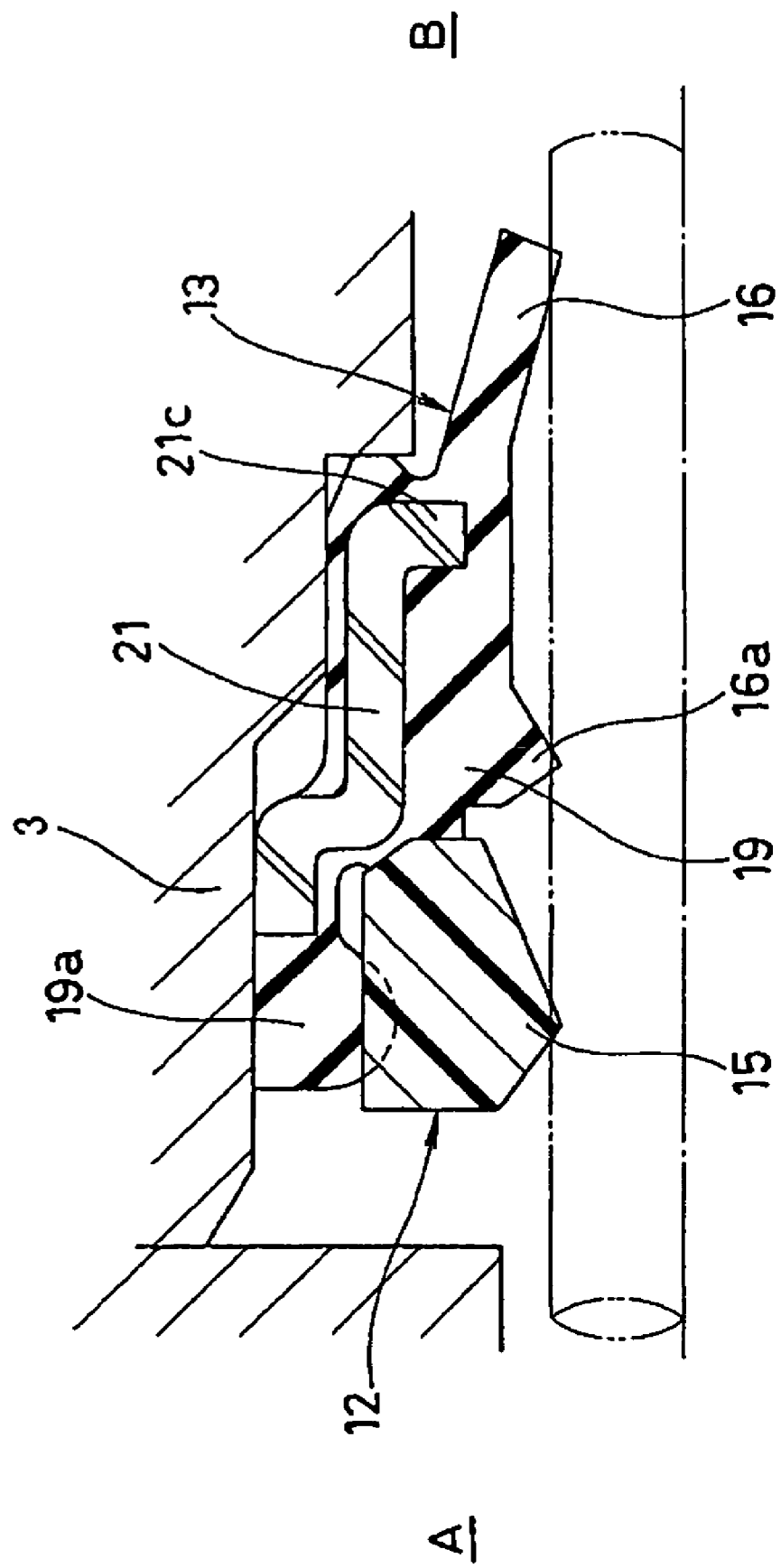
FIG. 14 is a sectional view of a plunger seal for a pump in accordance with a thirteenth embodiment of the present invention.

FIG. 14 is a sectional view of a main portion of a plunger seal 1 for a pump in accordance with a thirteenth embodiment of the present invention.

In the plunger seal 1 for the pump in FIG. 14, the fuel seal member 12 is constituted by the resin seal lip 15. Since an outer peripheral side of the seal lip 15 is fitted to the housing 3 in such a manner as to compress a sealed object side position 19a of a seal fixing portion 19 of the rubber oil seal member 13 adhered by vulcanization so as to cover the first metal ring 21, an energizing force is applied in a diametrical direction on the basis of an elastic force generated by the portion 19a to restore itself. The oil seal member 13 has a seal lip 16 integrally formed with the seal fixing portion 19 and adhered by vulcanization to the leading end of the inner peripheral side flange portion 21c of the first metal ring, and a sub seal lip 16a positioned in the sealed object side A and formed in an approximately triangular cross sectional shape in which a center leading end portion protrudes in a diametrical direction. A shape of the leading end portion of the seal lip 16 is constituted by a rectangular cross sectional shape, and the seal lip 16 is contracted toward the opposite side B to the sealed object so as to secure a sealing performance.

In the structure mentioned above, since the material of the fuel seal member 12 is constituted by the resin, it is possible to obtain excellent pressure resistance and oil resistance. Further, since the material of the oil seal member 13 is constituted by the rubber, it is possible to obtain an excellent sealing performance. Further, since and the oil seal member 13 are assembled so as to structure one seal system, and the coil spring is not used in both the seal members 12 and 13, the number of the parts is reduced at a time of assembling, and it is possible to achieve a compact structure, a cost reduction and a reduction of an assembling man-hour. Particularly, since the shape of the fuel seal member 12 is not complicated and is easily processed, it is possible to obtain a great effect of the cost reduction.

Fourteenth Embodiment

Figure 15:
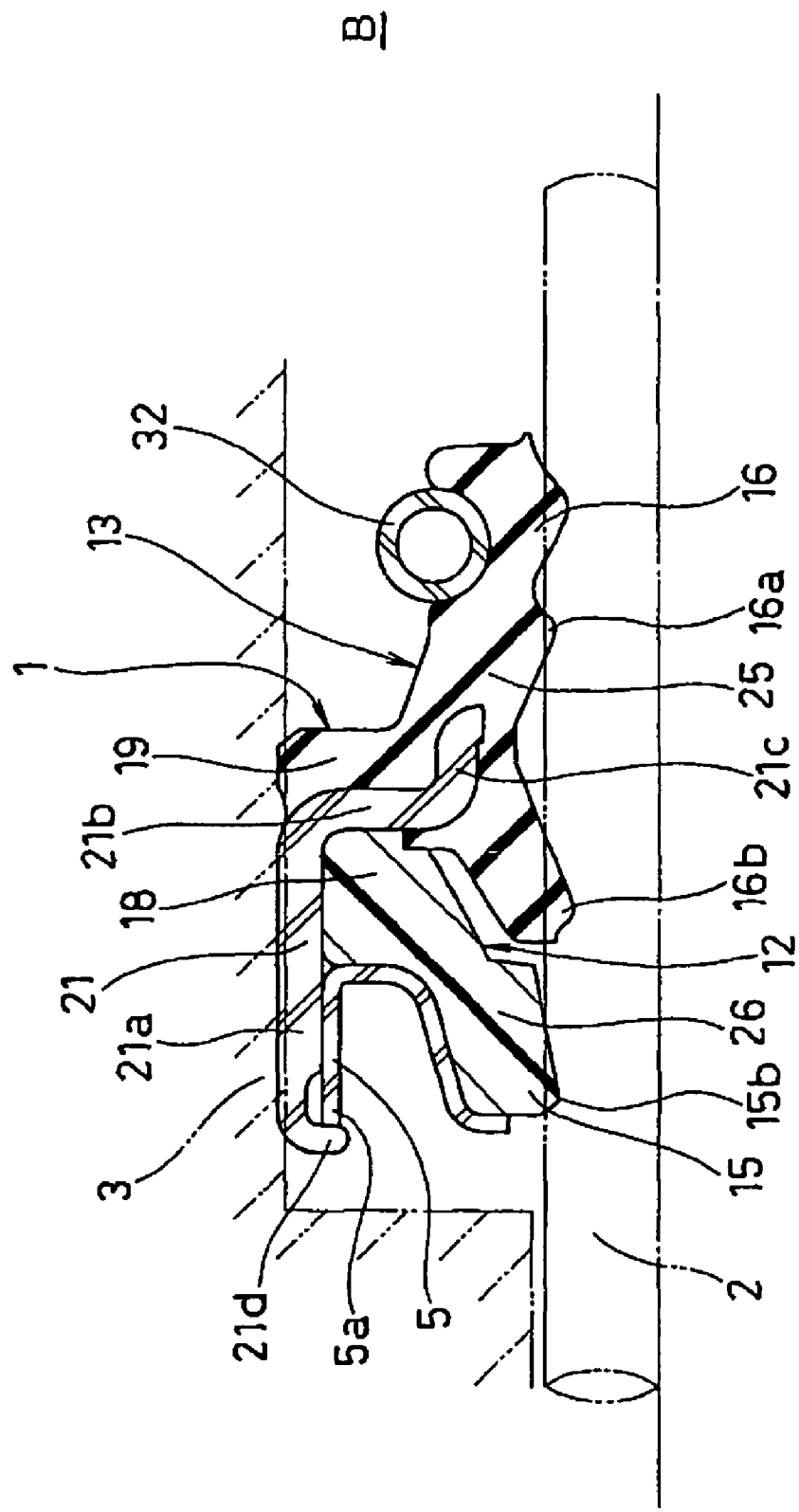
FIG. 15 is a sectional view of a plunger seal for a pump in accordance with a fourteenth embodiment of the present invention.
Figure 16:
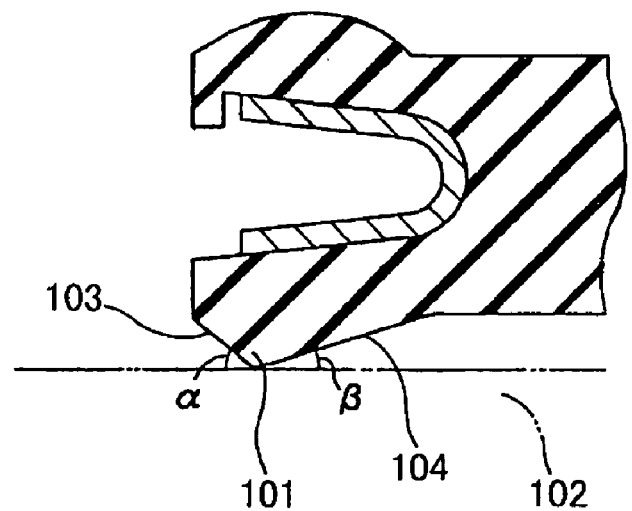
FIG. 16 is a sectional view of an elastic seal lip in accordance with a prior art.
Figure 17:
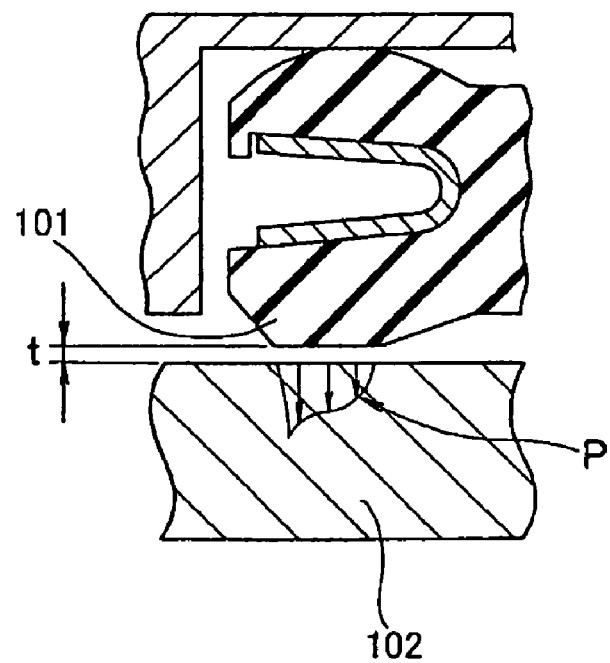
FIG. 17 is an explanatory view of a surface pressure gradient in FIG. 16.

FIG. 15 is a sectional view of a main portion of a plunger seal 1 for a pump in accordance with a fourteenth embodiment of the present invention.

The plunger seal 1 for the pump in FIG. 15 is provided with the metal ring 21 fitted to the inner periphery of the housing 3, the rubber oil seal member 13 adhered by vulcanization to the metal ring 21, the resin fuel seal member 12 fitted to the inner periphery of the metal ring 21, and a finger spring 5 installed to a portion between the metal ring 21 and the fuel seal member 12.

The metal ring 21 is constituted by an outer peripheral side cylinder portion 21a fitted to the inner periphery of the housing 3 and provided with a projection portion 21d on a terminal end at the sealed object side A, a flange portion 21b extending in an inner peripheral direction from a terminal end at the opposite side B to the sealed object of the outer peripheral side cylinder portion 21a, and an inner peripheral side cylinder portion 21c extending toward the opposite side B to the sealed object from an inner peripheral terminal end of the flange portion 21b.

In the oil seal member 13, a seal fixing portion 19, a seal lip 16, a sub lip 16a and a second seal lip 16b are integrally formed. The seal fixing portion 19 is adhered to the inner peripheral side cylinder portion 21c from the flange portion 21b of the metal ring 21 and is brought into close contact with the inner peripheral side end surface of the housing 3. The seal lip 16 extends toward the opposite side B to the sealed object from the seal fixing portion 19, mainly seals the oil, and has a concave portion at an outer peripheral side for installing a coil spring 32 for applying an energizing force. The sub lip 16a is positioned at the sealed object side A from the seal lip 16. The second seal lip 16b extends to the sealed object side A from the seal fixing portion 19.

The fuel seal member 12 is constituted by a seal fixing portion 18 fitted to an inner peripheral side of the outer peripheral side cylinder portion 21a of the metal ring 21, and a seal lip 15 integrally formed with the seal fixing portion 18, extending to the sealed object side, brought into contact with the plunger 2 and mainly sealing the fuel. The finger spring 5 is installed to a space formed by an outer peripheral side of the seal lip 15 and an inner peripheral side of the outer peripheral side cylinder portion 21a of the metal ring 21. The finger spring 5 applies an energizing force so as to energize the leading end portion 15b of the seal lip 15 in a direction of the plunger 2, and brings the leading end portion 5a of the finger spring 5 into contact with the projection portion 21d of the outer peripheral side cylinder portion 21a so as to regulate a distance at which the fuel seal member 12 is movable in an axial direction.

In the structure mentioned above, since the material of the fuel seal member 12 is constituted by the resin, it is possible to obtain excellent pressure resistance and oil resistance. Further, since the material of the oil seal member 13 is constituted by the rubber, it is possible to obtain an excellent sealing performance. Further, since the fuel seal member 12 and the oil seal member 13 are integrally formed so as to structure one seal system, it is possible to simplify the structure of the housing 3 and it is possible to reduce an assembling manhour, at a time of assembling the plunger seal 1 for the pump in the housing 3 corresponding to the opposite member. Further, since the fuel seal member 12 is movable to the sealed object side A so as to relieve an accumulated pressure on the basis of a freedom of the finger spring 5, at a time of accumulating pressure due to a small amount fuel leak from the fuel seal member 12, it is possible to reduce an abrasion of the oil seal member 13. Further, since the fuel seal member 12 positioned in the sealed object side A from the oil seal member 13 controls an excessive pressure and a pressure fluctuation operation, and the second seal lip 16b extending to the sealed object side A in the oil seal member 13 seals a small amount of fuel passing through the fuel seal member 12, it is possible to improve a sealing performance.

What is claimed is:

1. A plunger seal assembly for a pump, the plunger seal assembly being provided in an annular space between a shaft reciprocating within a high-pressure fuel injection pump and a housing, sealing a high-pressure fuel in a side of a sealed object and sealing an oil in an opposite side to the sealed object, said plunger seal assembly comprising:
   a metal ring mounted on an enlarged inner peripheral portion of the housing in the annular space; said metal ring having a cylindrical cross-section;
   a seal member mounted in said annular space; and
   an elastic member mounted on said seal member,
   said seal member including: a seal fixing portion pinched between an end surface of said metal ring and an end surface of said enlarged inner peripheral portion;
   a first seal lip brought into close contact with an inner peripheral surface of said metal ring;
   a body portion of the seal member being located between the seal fixing portion and the first seal lip, a gap defined between an outer surface of the body portion and the inner peripheral surface of the metal ring;
   a second seal lip slidably brought into close contact with said shaft, and said first and second seal lips constituting a fuel seal member directly sealing said high-pressure fuel; and
   an oil seal member positioned in the opposite side to the sealed object from said fuel seal member, slidably brought into close contact with said shaft and sealing said oil;
   said seal member being integrally made of a resin material;
   said elastic member being mounted on an outer peripheral surface of a leading end portion of said second seal lip to apply an energizing force to said second seal lip in a diametrical direction.

2. The plunger seal for a pump, according to claim 1, wherein said first seal lip forms an outer peripheral fixing and sealing portion brought into close contact with the inner peripheral surface of said metal ring, a groove is defined between said outer peripheral fixing and sealing portion and said second sealing lip and is open to said sealed object side, and said elastic member having a U-shaped is installed in said groove to apply an energizing force to said outer peripheral fixing and sealing portion and second seal lip in a diametrical direction.

* * * * *